(12) United States Patent
Jung et al.

(10) Patent No.: US 10,622,625 B2
(45) Date of Patent: Apr. 14, 2020

(54) POSITIVE ELECTRODE AND SECONDARY BATTERY INCLUDING THE SAME

(71) Applicant: LG Chem, Ltd., Seoul (KR)

(72) Inventors: Hye Ri Jung, Daejeon (KR); Jung Pil Lee, Daejeon (KR)

(73) Assignee: LG Chem, Ltd. (KR)

( * ) Notice: Subject to any disclaimer, the term of this patent is extended or adjusted under 35 U.S.C. 154(b) by 106 days.

(21) Appl. No.: 15/751,343

(22) PCT Filed: Jul. 4, 2017

(86) PCT No.: PCT/KR2017/007116
§ 371 (c)(1),
(2) Date: Feb. 8, 2018

(87) PCT Pub. No.: WO2018/008954
PCT Pub. Date: Jan. 11, 2018

(65) Prior Publication Data
US 2018/0233738 A1 Aug. 16, 2018

(30) Foreign Application Priority Data

Jul. 4, 2016 (KR) .................. 10-2016-0083958
Jul. 4, 2017 (KR) .................. 10-2017-0085057

(51) Int. Cl.
*H01M 4/02* (2006.01)
*H01M 4/36* (2006.01)
(Continued)

(52) U.S. Cl.
CPC ............. *H01M 4/366* (2013.01); *H01M 4/02* (2013.01); *H01M 4/131* (2013.01); *H01M 4/36* (2013.01);
(Continued)

(58) Field of Classification Search
CPC .......... H01M 4/366; H01M 4/36; H01M 4/02; H01M 10/0525; H01M 4/525;
(Continued)

(56) References Cited

U.S. PATENT DOCUMENTS 9,012,090 B2  4/2015  Bae et al.
2009/0104528 A1  4/2009  Takahashi et al.
(Continued)

FOREIGN PATENT DOCUMENTS

EP  2498323 A2  9/2012
EP  2953194 A1  12/2015
(Continued)

OTHER PUBLICATIONS

Search report from International Application No. PCT/KR2017/007116, dated Sep. 20, 2017.
(Continued)

*Primary Examiner* — Cynthia K Walls
(74) *Attorney, Agent, or Firm* — Lerner, David, Littenberg, Krumholz & Mentlik, LLP

(57) ABSTRACT

The present invention relates to a positive electrode and a secondary battery including the same, and particularly, to a positive electrode which includes a current collector; a first active material layer including first active material particles and disposed on the current collector; and a first pattern and a second pattern alternately disposed separately from each other on the first active material layer, wherein the first pattern includes first pattern active material particles, the second pattern includes second pattern active material particles, the first pattern has a thickness greater than that of the second pattern, and the second pattern has a volume expansion rate greater than that of the first pattern, and a secondary battery including the same.

8 Claims, 1 Drawing Sheet

(51) Int. Cl.
   *H01M 4/131* (2010.01)
   *H01M 4/505* (2010.01)
   *H01M 4/525* (2010.01)
   *H01M 10/0525* (2010.01)

(52) U.S. Cl.
   CPC .......... *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
   CPC ............... H01M 4/505; H01M 4/131; H01M 2004/028; H01M 2004/021; H01M 4/364; Y02E 60/122
   See application file for complete search history.

(56) References Cited

U.S. PATENT DOCUMENTS

| | | | |
|---|---|---|---|
| 2010/0040951 A1* | 2/2010 | Yamamoto | H01M 4/134 429/231.95 |
| 2011/0294009 A1 | 12/2011 | Kawakami et al. | |
| 2014/0242459 A1 | 8/2014 | Sanada | |
| 2015/0372307 A1 | 12/2015 | Shigematsu et al. | |
| 2016/0226064 A1 | 8/2016 | Kitayoshi | |

FOREIGN PATENT DOCUMENTS

| | | |
|---|---|---|
| JP | 2003197180 A | 7/2003 |
| JP | 2009252498 A | 10/2009 |
| JP | 2010238426 A | 10/2010 |
| JP | 2012009418 A | 1/2012 |
| JP | 2014038794 A | 2/2014 |
| JP | 2014164982 A | 9/2014 |
| JP | 2014191876 A | 10/2014 |
| JP | 2015072753 A | 4/2015 |
| JP | 2017228421 A | 12/2017 |
| KR | 20160050255 A | 5/2016 |
| WO | 2007052803 A1 | 5/2007 |
| WO | 2014119554 A1 | 8/2014 |

OTHER PUBLICATIONS

European Search Report for EP Application No. 17824510, dated Feb. 23, 2018.

* cited by examiner

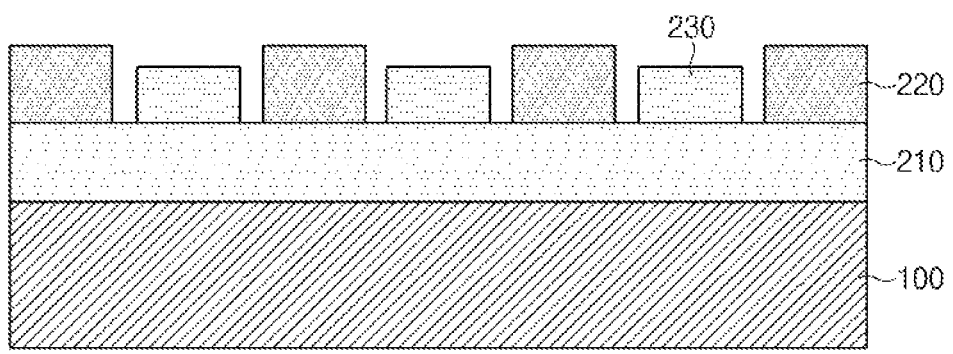

POSITIVE ELECTRODE AND SECONDARY BATTERY INCLUDING THE SAME

CROSS-REFERENCE TO RELATED APPLICATION

The present application is a national phase entry under 35 U.S.C. § 371 of International Application No. PCT/KR2017/007116, filed on Jul. 4, 2017, which claims priority to and the benefit of Korean Patent Application No. 10-2016-0083958, filed on Jul. 4, 2016, and Korean Patent Application No. 10-2017-0085057, filed on Jul. 4, 2017, the disclosures of which are incorporated herein by reference in their entirety.

TECHNICAL FIELD

The present invention relates to a positive electrode and a secondary battery including the same, and the positive electrode includes a first active material layer, a first pattern, and a second pattern, wherein the first pattern has a thickness greater than that of the second pattern, and the second pattern has a volume expansion rate greater than that of the first pattern.

BACKGROUND ART

With a rapid increase in the use of fossil fuels, there is an increasing demand for use of alternative energy or clean energy. The field of electricity generation and accumulation using an electrochemical reaction has been most actively studied to meet the increasing demand.

As a representative example of electrochemical devices using such electrochemical energy, secondary batteries are currently used and an application area thereof has gradually been increased. Recently, with an increase in development of technology and demand for portable devices, such as portable computers, mobile phones, cameras, and the like, demand for secondary batteries as energy sources is rapidly increasing. Among such secondary batteries, much research on lithium secondary batteries, which have high energy density, high operating voltage, a long cycle lifespan, and a low self-discharge rate, has been conducted, and such lithium secondary batteries are commercially available and widely used.

Generally, a secondary battery is composed of a positive electrode, a negative electrode, an electrolyte, and a separator. In the secondary battery, lithium ions emitted from a positive electrode active material are intercalated into a negative electrode active material such as a carbon particle through $1^{st}$ charging and the lithium ions are deintercalated through discharging. As lithium ions reciprocate between opposite electrodes as such, they transfer energy. Therefore, the secondary battery can be charged and discharged.

An amount of an active material in a positive electrode is the most important factor that determines charge and discharge capacity of a battery. Therefore, in order to manufacture a high-capacity electrode, a high level of a positive electrode active material is loaded on a surface of a current collector. However, in the case of a positive electrode in which a high level of an active material is loaded, electrolyte wetting with respect to an active material layer is reduced, and charging and discharging characteristics, such as quick charging and output characteristics, of a battery are degraded due to a difference in reactivity in a thickness direction of an electrode.

In order to solve the problem, a method of increasing the porosity of an active material layer has been used, but when an active material layer having high porosity is used to realize the same level of capacity, a thickness of an electrode becomes thick. Accordingly, a problem in designing a cell having high energy density arises.

Therefore, there is a need to develop a positive electrode which may improve electrolyte wetting and enhance charging and discharging characteristics of a battery while maintaining high capacity of the battery.

DISCLOSURE

Technical Problem

It is an aspect of the present invention to provide a positive electrode which may improve electrolyte wetting and enhance charging and discharging characteristics of a battery while maintaining high capacity of the battery.

It is another aspect of the present invention to improve stability of a battery.

Technical Solution

In order to accomplish the above objectives, according to an embodiment of the present invention, there is provided a positive electrode which includes a current collector; a first active material layer including first active material particles and disposed on the current collector; and a first pattern and a second pattern alternately disposed separately from each other on the first active material layer, wherein the first pattern includes first pattern active material particles, the second pattern includes second pattern active material particles, the first pattern has a thickness greater than that of the second pattern, and the second pattern has a volume expansion rate greater than that of the first pattern.

In addition, according to another embodiment of the present invention, there is provided a secondary battery including the positive electrode.

Advantageous Effects

A positive electrode according to the present invention includes a first active material layer in which a high level of an active material is loaded, a portion thereof is exposed to an electrolyte, and a first pattern and a second pattern, which are disposed separately from each other so that electrolyte wetting can be improved, and thus high capacity and improved charging and discharging characteristics of a battery can be ensured. Also, by adjusting components of the first pattern and the second pattern, a thickness of an electrode is minimized, and stress of an electrode generated upon charging and discharging is decreased through the pattern layer, thereby mechanical stability of an electrode can be improved.

DESCRIPTION OF DRAWINGS

FIG. 1 is a cross-sectional schematic diagram of a positive electrode according to an embodiment of the present invention.

MODE OF THE INVENTION

Hereinafter, the present invention will be described in more detail for promoting an understanding of the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

The terminology provided herein is merely used for the purpose of describing particular embodiments, and is not intended to be limiting of the present invention. The singular forms "a," "an," and "the" are intended to include the plural forms as well, unless the context clearly indicates otherwise.

It should be understood that the terms "comprises," "comprising," "includes," "including," "has," and/or "having," when used herein, specify the presence of stated features, integers, steps, operations, elements, components and/or combinations thereof, but do not preclude the presence or addition of one or more other features, integers, steps, operations, elements, components and/or combinations thereof.

Referring to FIG. 1, a positive electrode according to an embodiment of the present invention includes a current collector; a first active material layer including first active material particles and disposed on the current collector; and a first pattern and a second pattern alternately disposed separately from each other on the first active material layer, wherein the first pattern includes first pattern active material particles, the second pattern includes second pattern active material particles, the first pattern has a thickness greater than that of the second pattern, and the second pattern has a volume expansion rate greater than that of the first pattern.

The current collector does not cause a chemical change in a secondary battery and has conductivity. For example, copper, stainless steel, aluminum, nickel, titanium, calcined carbon, aluminum or stainless steel whose surface is treated with carbon, nickel, titanium, silver, or the like may be used as the current collector.

According to an embodiment of the present invention, the first active material layer may be disposed on the current collector. Also, each of the first pattern and the second pattern may be disposed on the first active material layer. Referring to FIG. 1, a first active material layer 210 may be evenly disposed on a current collector 100 without a separated portion. Each of a first pattern 220 and a second pattern 230 may be alternately disposed separately from each other on the first active material layer 210. Specifically, an irregular shape may be formed on the first active material layer due to the first pattern and the second pattern.

In the case of a conventional positive electrode including a highly loaded active material layer not having an irregular shape on a surface thereof, since an amount of an electrolyte, with which an active material layer is impregnated, is significantly decreased from the vicinity of an electrode surface toward the vicinity of a current collector surface, lithium ions are not smoothly intercalated and deintercalated, and thus charging and discharging characteristics are degraded. According to an embodiment of the present invention, since a contact area between a positive electrode and an electrolyte may be increased due to an irregular shape formed by a first pattern and a second pattern, electrolyte wetting may be improved, and charging and discharging characteristics of a battery may be enhanced. Moreover, a highly loaded first active material layer is exposed between the first pattern and the second pattern so that an electrolyte may easily penetrate in a direction of a current collector, and thus electrolyte wetting may be further improved.

In addition, the first pattern may have a thickness greater than that of the second pattern. Particularly, the first pattern has a thickness 1.1 to 2 times, more particularly, 1.2 to 1.5 times greater than that of the second pattern.

The second pattern may have a volume expansion rate greater than that of the first pattern. The volume expansion rate may be calculated from an increase amount of thickness after a $1^{st}$ cycle of charging and discharging compared to an initial thickness of the first pattern or the second pattern. Specifically, the volume expansion rate means a ratio of an amount of change in a thickness increased after a $1^{st}$ cycle of charging and discharging to an initial thickness of the electrode. In this case, the $1^{st}$ cycle of charging and discharging is performed by CC-CV charging a battery at 0.1 C and cutting off at 4.25 to 4.4 V and 0.02 C, and CC discharging the battery at 0.1 C and cutting off at 3 V.

More specifically, the volume expansion rate is calculated by Equation 1 below in which A may represent a thickness of a first pattern or a second pattern before charging and discharging and B may represent a thickness of a first pattern or a second pattern after charging and discharging.

Volume expansion rate=$[(B-A)/A] \times 100$       [Equation 1]

The thickness may be measured using a Mauser micrometer or a scanning electron microscope (SEM).

Since a second pattern has a relative less thickness, even when the second pattern having a relative less thickness is significantly expanded, a thickness of a positive electrode may not be excessively increased, and the second pattern may not come in contact with the adjacent first pattern or, even when it comes in contact with the first pattern, stress may not be excessively applied to the first pattern. Therefore, an excessive increase in a battery thickness caused by expansion of a positive electrode upon charging may be prevented, and mechanical stability of the positive electrode may be ensured.

The first active material layer may include first active material particles, the first pattern may include the first pattern active material particles, and the second pattern may include the second pattern active material particles.

The composition of at least one of the first active material particle, the first pattern active material particle, and the second pattern active material particle may be different from the compositions of the others.

According to an embodiment of the present invention, the first active material particle and the first pattern active material particle may be $LiCoO_2$, and the second pattern active material particle may be at least one of $LiNi_{1-x1-y1}Co_{x1}Mn_{y1}O_2$ (0<x1<1 and 0<y1<1) and $LiNi_{1-x2-y2}Co_{x2}Al_{y2}O_2$ (0<x2<1 and 0<y2<1). Specifically, $LiNi_{1-x1-y1}Co_{x1}Mn_{y1}O_2$ (0<x1<1 and 0<y1<1) may be $LiNi_{0.6}Co_{0.2}Mn_{0.2}O_2$, and $LiNi_{1-x2-y2}Co_{x2}Al_{y2}O_2$ (0<x2<1 and 0<y2<1) may be $LiNi_{0.85}Co_{0.1}Al_{0.05}O_2$.

When $LiCoO_2$ is used as a first active material particle and a first pattern active material particle, which are included in the first active material layer which accounts for most of the components disposed on a current collector and the first pattern, a battery may have high capacity when being operated at high voltage due to characteristics of $LiCoO_2$. Also, when $LiCoO_2$ is used, since manufacturing, coating, and rolling processes are easily performed, manufacturing costs and time may be reduced, and electrode density may be increased. Moreover, when at least one of $LiNi_{1-x1-y1}Co_{x1}Mn_{y1}O_2$ (0<x1<1 and 0<y1<1) and $LiNi_{1-x2-y2}Co_{x2}Al_{y2}O_2$ (0<x2<1 and 0<y2<1) is used as a second pattern active material particle included in the second pattern disposed on a surface of an electrode, a battery may have improved charging and discharging characteristics due to characteristics of $LiNi_{1-x1-y1}Co_{x1}Mn_{y1}O_2$ ($0<x1<1$ and $0<y1<1$) and $LiNi_{1-x2-y2}Co_{x2}Al_{y2}O_2$ ($0<x2<1$ and $0<y2<1$), with which lithium ions are smoothly intercalated and deintercalated.

Meanwhile, $LiNi_{1-x1-y1}Co_{x1}Mn_{y1}O_2$ ($0<x1<1$ and $0<y1<1$) and $LiNi_{1-x2-y2}Co_{x2}Al_{y2}O_2$ ($0<x2<1$ and $0<y2<1$) have relatively high volume expansion rates upon discharging compared to $LiCoO_2$. Therefore, in the structure according to an embodiment of the present invention, although the second pattern has a relatively high volume expansion rate, the second pattern has a relatively low thickness, and thus it is possible to prevent a thickness of the second pattern from becoming excessively larger than that of the first pattern upon charging and discharging. Therefore, a thickness of a positive electrode may not be excessively increased, and the second pattern may not come in contact with the adjacent first pattern or, even when it comes in contact with the first pattern, stress may not be excessively applied to the first pattern. Therefore, an increase in a size of a battery may be prevented, and mechanical stability of a positive electrode may be ensured. These effects may be further improved by alternately disposing the first pattern and the second pattern.

Another embodiment of the present invention is similar to the above-described embodiment, but differs in that the first active material particle is at least one of $LiNi_{1-x1-y1}Co_{x1}Mn_{y1}O_2$ ($0<x1<1$ and $0<y1<1$) and $LiNi_{1-x2-y2}Co_{x2}Al_{y2}O_2$ ($0<x2<1$ and $0<y2<1$), the first pattern active material particle and the second pattern active material particle are $LiCoO_2$, and the second pattern has a porosity lower than that of the first pattern. Specifically, $LiNi_{1-x1-y1}Co_{x1}Mn_{y1}O_2$ ($0<x1<1$ and $0<y1<1$) may be $LiNi_{0.6}Co_{0.2}Mn_{0.2}O_2$, and $LiNi_{1-x2-y2}Co_{x2}Al_{y2}O_2$ ($0<x2<1$ and $0<y2<1$) may be $LiNi_{0.85}Co_{0.1}Al_{0.05}O_2$.

When at least one of $LiNi_{1-x1-y1}Co_{x1}Mn_{y1}O_2$ ($0<x1<1$ and $0<y1<1$) and $LiNi_{1-x2-y2}Co_{x2}Al_{y2}O_2$ ($0<x2<1$ and $0<y2<1$) is used as a first active material particle included in the first active material layer, which accounts for most of the components disposed on a current collector, charging and discharging characteristics of a battery may be improved due to characteristics of $LiNi_{1-x1-y1}Co_{x1}Mn_{y1}O_2$ ($0<x1<1$ and $0<y1<1$) and $LiNi_{1-x2-y2}Co_{x2}Al_{y2}O_2$ ($0<x2<1$ and $0<y2<1$), with which lithium ions are smoothly intercalated and deintercalated, and a change in a battery thickness upon discharging may be minimized. Also, when $LiCoO_2$ is used as the first pattern active material particle and the second pattern active material particle, high capacity of a battery may be ensured when being operated at high voltage, and the first pattern and the second pattern may be smoothly formed due to characteristics of $LiCoO_2$ whose manufacturing process is smooth.

In addition, since the second pattern has a porosity lower than that of the first pattern, energy density is improved due to the second pattern, and thus capacity of a battery may be improved. Moreover, since the second pattern has a porosity lower than that of the first pattern, the second pattern may have a volume expansion rate higher than that of the first pattern. Since the second pattern has a thickness lower than that of the first pattern, a thickness of the second pattern may not excessively exceed that of the first pattern even when the second pattern is significantly expanded, and thus a thickness of a positive electrode may not be excessively increased, and the second pattern may not come in contact with the adjacent first pattern or, even when it comes in contact with the first pattern, stress may not be excessively applied to the first pattern. Therefore, an excessive increase in a thickness of a positive electrode caused by expansion of a positive electrode upon charging may be prevented, and mechanical stability of a positive electrode may be ensured. Specifically, the first pattern may have a porosity 5 percentage points or more higher than that of the second pattern. More specifically, the first pattern may have a porosity of 23 to 30%, and the second pattern may have a porosity of 18 to 25%. The porosity may be calculated by measuring a loading amount ($g/25$ $cm^2$) and a thickness of an electrode.

Still another embodiment of the present invention is similar to the above-described embodiment, but differs in that the first active material particle is $LiCoO_2$, the first pattern active material particle is at least one of $LiNi_{1-x1-y1}Co_{x1}Mn_{y1}O_2$ ($0<x1<1$ and $0<y1<1$) and $LiNi_{1-x2-y2}Co_{x2}Al_{y2}O_2$ ($0<x2<1$ and $0<y2<1$), the second pattern active material particle is at least one of $LiFePO_4$ and $LiMn_2O_4$, and the second pattern has a porosity lower than that of the first pattern. Specifically, $LiNi_{1-x1-y1}Co_{x1}Mn_{y1}O_2$ ($0<x1<1$ and $0<y1<1$) may be $LiNi_{0.6}Co_{0.2}Mn_{0.2}O_2$, and $LiNi_{1-x2-y2}Co_{x2}Al_{y2}O_2$ ($0<x2<1$ and $0<y2<1$) may be $LiNi_{0.85}Co_{0.1}Al_{0.05}O_2$.

When $LiCoO_2$ is used as a first active material particle included in the first active material layer, which accounts for most of the components disposed on a current collector, high capacity of a battery may be ensured when being operated at high voltage due to characteristics of $LiCoO_2$. Also, when $LiCoO_2$ is used, since manufacturing, coating, and rolling processes are easily performed, manufacturing costs and time may be reduced, and electrode density may be increased. Moreover, when at least one of $LiNi_{1-x1-y1}Co_{x1}Mn_{y1}O_2$ ($0<x1<1$ and $0<y1<1$) and $LiNi_{1-x2-y2}Co_{x2}Al_{y2}O_2$ ($0<x2<1$ and $0<y2<1$) is used as a first pattern active material particle included in the first pattern disposed on a surface of an electrode, a battery may have improved charging and discharging characteristics due to characteristics of $LiNi_{1-x1-y1}Co_{x1}Mn_{y1}O_2$ ($0<x1<1$ and $0<y1<1$) and $LiNi_{1-x2-y2}Co_{x2}Al_{y2}O_2$ ($0<x2<1$ and $0<y2<1$), with which lithium ions are smoothly intercalated and deintercalated. In addition, when at least one of $LiFePO_4$ and $LiMn_2O_4$ is used as a second pattern active material particle included in the second pattern, thermal stability of a battery may be ensured due to the strong binding force between P and O in $LiFePO_4$ and structural stability of a 3D tunnel structure of $LiMn_2O_4$. Since a small amount of the second pattern is included in an electrode compared to the first pattern, it is desirable to use at least one of $LiNi_{1-x1-y1}Co_{x1}Mn_{y1}O_2$ ($0<x1<1$ and $0<y1<1$) and $LiNi_{1-x2-y2}Co_{x2}Al_{y2}O_2$ ($0<x2<1$ and $0<y2<1$) as a first pattern active material particle to increase charging and discharging characteristics.

Additionally, since the second pattern has a porosity lower than that of the first pattern, energy density is improved due to the second pattern, and thus capacity of a battery may be improved. Moreover, since the second pattern has a porosity lower than that of the first pattern, the second pattern may have a volume expansion rate higher than that of the first pattern. Since the second pattern has a thickness lower than that of the first pattern, a thickness of the second pattern may not excessively exceed that of the first pattern even when the second pattern is significantly expanded, and thus a thickness of an electrode may not be excessively increased, and the second pattern may not come in contact with the adjacent first pattern or, even when it comes in contact with the first pattern, stress may not be excessively applied to the first pattern. Therefore, an excessive increase in a battery thickness caused by expansion of an electrode upon charging may be prevented, and mechanical stability of a positive electrode may be ensured. Specifically, the first pattern may have a porosity 5 percentage points or more than that of the second pattern. More specifically, the first pattern may have a porosity of 23 to 30%, and the second pattern may have a porosity of 18 to 25%. The porosity may be calculated by measuring a loading amount (g/25 cm$^2$) and a thickness of an electrode.

According to an embodiment of the present invention, each of the first active material layer, the first pattern, and the second pattern may include a binder and a conductive material.

As the binder, any of various types of binder polymers such as a polyvinylidene fluoride-hexafluoropropylene copolymer (PVDF-co-HFP), polyvinylidene fluoride, polyacrylonitrile, polymethyl methacrylate, polyvinyl alcohol, carboxymethyl cellulose (CMC), starches, hydroxypropyl cellulose, regenerated cellulose, polyvinyl pyrrolidone, tetrafluoroethylene, polyethylene, polypropylene, polyacrylic acid, an ethylene-propylene-diene monomer (EPDM), a sulfonated EPDM, styrene-butadiene rubber (SBR), fluoro-rubber, polyacrylic acid, a polymer in which hydrogen atoms of the above polymers are substituted with Li, Na, Ca or the like, various copolymers, and the like may be used.

The conductive material is not particularly limited as long as it does not cause a chemical change in the battery and has conductivity. For example, graphite such as natural graphite, artificial graphite or the like; carbon black such as carbon black, acetylene black, Ketjen black, channel black, furnace black, lamp black, thermal black or the like; a conductive fiber such as carbon fiber, metallic fiber or the like; a conductive tube such as carbon nanotubes or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like may be used as the conductive material.

The positive electrode according to an embodiment of the present invention may be manufactured by applying, on a current collector, a slurry prepared by mixing an electrode mixture including an active material, a conductive material, and a binder in a solvent, followed by drying and rolling. Specifically, a first active material layer is formed on the current collector by the above method, and then a first pattern and a second pattern may be formed on the first active material layer. The first active material layer, the first pattern, and the second pattern may be formed by using one or a combination of two or more of screen printing, inkjet printing, spray printing, gravure printing, heat transfer printing, a Toppan printing method, intaglio printing, and offset printing. The solvent may be a solvent generally used in the art, and may be one or a mixture of two or more of dimethyl sulfoxide (DMSO), isopropyl alcohol, N-methylpyrrolidone (NMP), acetone, water, and the like.

More specifically, the first active material layer may be formed by applying a slurry for forming a first active material layer on a current collector, followed by drying. Afterward, a pattern mask may be disposed on the first active material layer, and then a slurry for forming a second pattern may be applied, dried, and rolled to optionally form a second pattern having a specific thickness on a portion of the first active material layer. Then, the pattern mask is removed, and another pattern mask may be disposed on a portion of the first active material layer and the second pattern to form a first pattern. Afterward, a slurry for forming a first pattern may be applied, dried, and rolled to form a first pattern having a specific thickness. Then, the pattern mask is removed. However, the present invention is not limited to the method described above. In some cases, a first pattern and a second pattern may be formed by using an etching process.

In the first active material layer, a first active material particle, a binder, and a conductive material may be included in a weight ratio of 95 to 99:0.7 to 2.5:0.3 to 2.5. Also, in the first pattern, a first pattern active material particle, a binder, and a conductive material may be included in a weight ratio of 95 to 99:0.7 to 2.5:0.3 to 2.5, and, in the second pattern, a second pattern active material particle, a binder, and a conductive material may be included in a weight ratio of 95 to 99:0.7 to 2.5:0.3 to 2.5.

According to another embodiment of the present invention, a secondary battery may include a negative electrode, a positive electrode, a separator interposed between the positive electrode and the negative electrode, and an electrolyte, and the positive electrode may be the electrode according to an embodiment of the present invention.

The negative electrode may include a negative electrode current collector and a negative electrode active material layer disposed on the negative electrode current collector and including a negative electrode active material.

In the negative electrode, the negative electrode current collector does not cause a chemical change in a secondary battery and has conductivity. For example, copper, stainless steel, aluminum, nickel, titanium, calcined carbon, or aluminum or stainless steel whose surface is treated with carbon, nickel, titanium, silver or the like may be used as the negative electrode current collector.

The negative electrode active material may be a compound capable of reversible intercalation and deintercalation of lithium ions. As a specific example, any one or a mixture of two or more of a carbon-based material such as artificial graphite, natural graphite, graphitized carbon fiber, amorphous carbon or the like; a metallic compound capable of alloying with lithium such as Si, Al, Sn, Pb, Zn, Bi, In, Mg, Ga, Cd, a Si alloy, a Sn alloy, an Al alloy or the like; a metal oxide capable of doping and dedoping lithium ions such as SiO$_x$ (0<x<2), SnO$_2$, vanadium oxide or lithium vanadium oxide; and a composite including the metallic compound and the carbon-based material such as a Si—C composite or a Sn—C composite may be used as the negative electrode active material. Also, a lithium metal thin film may be used as the negative electrode active material. In addition, all of low-crystallinity carbon, high-crystallinity carbon and the like may be used as the carbon material. A representative example of the low-crystallinity carbon is soft carbon or hard carbon, and a representative example of the high-crystallinity carbon is high-temperature calcined carbon such as amorphous, platy, flaky, spherical or fibrous natural graphite or artificial graphite, kish graphite, pyrolytic carbon, mesophase pitch-based carbon fiber, meso-carbon microbeads, mesophase pitches, petroleum or coal tar pitch-derived coke or the like.

The separator serves to separate the negative electrode and the positive electrode and to provide a flow passage for lithium ions. The separator is not particularly limited as long as it is used as a separator in a common secondary battery, and particularly, a separator which exhibits low resistance to migration of electrolyte ions and has an excellent ability of absorbing an electrolyte is preferable. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer or the like, or a stacked structure having two or more layers made thereof may be used as the separator.

Alternatively, a common porous non-woven fabric, for example, a non-woven fabric made of high melting point glass fiber, polyethylene terephthalate fiber or the like may be used as the separator. Also, in order to ensure heat resistance or mechanical strength, a coated separator including ceramic components or polymer materials may be used, and the separator may have a single-layer or multi-layer structure.

The electrolyte may be an organic liquid electrolyte, an inorganic liquid electrolyte, a solid polymer electrolyte, a gel-type polymer electrolyte, an inorganic solid electrolyte, a molten-type inorganic electrolyte or the like, which may be used in the manufacture of a lithium secondary battery, but the present invention is not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydroxy Franc, 2-methyltetrahydrofuran, dimethyl sulfoxide, 1,3-dioxolane, formamide, dimethylformamide, dioxolane, acetonitrile, nitromethane, methyl formate, methyl acetate, a phosphoric acid triester, trimethoxymethane, a dioxolane derivative, sulfolane, methylsulfolane, 1,3-dimethyl-2-imidazolidinone, a propylene carbonate derivative, a tetrahydrofuran derivative, an ether, methyl propionate, ethyl propionate, or the like may be used.

Particularly, among the carbonate-based organic solvents, ethylene carbonate and propylene carbonate, which are cyclic carbonate compounds, are preferably used because they are high-viscosity organic solvents and dissociate a lithium salt effectively due to their high dielectric constant. It is more preferable that such a cyclic carbonate compound is used in combination with a linear carbonate compound having low viscosity and a low dielectric constant such as dimethyl carbonate and diethyl carbonate in an appropriate ratio because an electrolyte having high electric conductivity may be formed.

The metal salt may be a lithium salt, which is a material that is readily soluble in the non-aqueous electrolyte. For example, the lithium salt may include, as an anion, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In addition to the electrolyte components, for the purpose of improving lifespan characteristics of the battery, suppressing a decrease in battery capacity, improving discharge capacity of the battery and the like, the electrolyte may further include one or more additives such as a haloalkylene carbonate-based compound such as difluoroethylene carbonate or the like, pyridine, triethyl phosphite, triethanolamine, a cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkyl ethers, ammonium salts, pyrrole, 2-methoxyethanol, aluminum trichloride and the like.

According to another embodiment of the present invention, there are provided a battery module including the secondary battery as a unit cell and a battery pack including the same. Since the battery module and the battery pack include the secondary battery which has high capacity, rate characteristics, and cycle characteristics, the battery pack may be used as a power source for medium- to large-sized devices selected from the group consisting of an electric vehicle, an hybrid electric vehicle, a plug-in hybrid electric vehicle, and a power storage system.

BEST MODE

Hereinafter, preferred embodiments of the present invention will be described in order to aid in understanding the present invention. However, it is apparent to those skilled in the art that the description proposed herein is just a preferable example for the purpose of illustration only, and is not intended to limit or define the scope of the invention. Therefore, it should be understood that various changes and modifications can be made to the exemplary embodiments of the present invention without departing from the scope of the present invention, so that the present invention covers all such changes and modifications provided they are within the scope of the appended claims and their equivalents.

EXAMPLES AND COMPARATIVE EXAMPLES

Example 1: Manufacture of Battery (1) Manufacture of Positive Electrode
1) Formation of First Active Material Layer
$LiCoO_2$ having an average particle size ($D_{50}$) of 16 μm, polyvinylidene fluoride (PVDF) as a binder, and carbon black as a conductive material were mixed in a weight ratio of 97:1.8:1.2 to prepare 5 g of a mixture. 28.9 g of N-methylpyrrolidone (NMP) was added to the mixture to prepare a positive electrode slurry. The positive electrode slurry was applied on an aluminum current collector having a thickness of 20 μm and dried. In this case, the temperature of circulating air was 120° C. Afterward, rolling was performed to form a first active material layer having a thickness of 60 μm.

2) Formation of Second Pattern
$LiNi_{0.6}Co_{0.2}Mn_{0.2}O_2$ having an average particle size ($D_{50}$) of 13 μm as a second pattern active material particle, PVDF as a binder, and carbon black as a conductive material were mixed in a weight ratio of 97:1.8:1.2 to prepare 5 g of a mixture. 28.9 g of NMP was added to the mixture to prepare a positive electrode slurry. Meanwhile, a pattern mask was disposed on a portion of the first active material layer, and then the positive electrode slurry was applied and dried. In this case, the temperature of circulating air was 120° C. Afterward, the pattern mask was removed and rolling was performed to form a second pattern having a thickness of 20 μm and a porosity of 24%.

3) Formation of First Pattern
$LiCoO_2$ having an average particle size ($D_{50}$) of 12 μm as a first pattern active material particle, PVDF as a binder, and carbon black as a conductive material were mixed in a weight ratio of 97:1.8:1.2 to prepare 5 g of a mixture. 28.9 g of NMP was added to the mixture to prepare a positive electrode slurry. Meanwhile, a pattern mask was disposed on a portion of the first active material layer and the second pattern, and then the positive electrode slurry was applied on the first active material layer and dried. In this case, the temperature of circulating air was 120° C. Afterward, the pattern mask was removed and rolling was performed to form a first pattern having a thickness of 30 μm and a porosity of 29%.

4) Drying and Punching Processes
Afterward, a current collector, on which the first active material layer, the first pattern, and the second pattern were formed, was dried in a vacuum oven set to 130° C. for 12 hours, and punched in a circular shape of 1.4875 $cm^2$ to manufacture a positive electrode.

(2) Manufacture of Battery
A lithium metal thin film cut in a circular shape of 1.7671 $cm^2$ was used as a negative electrode. The negative electrode and the manufactured positive electrode were used to manufacture a battery. Specifically, a porous polyethylene separator was interposed between the positive electrode and the negative electrode to manufacture an electrode assembly. Meanwhile, 0.5 wt % of vinylene carbonate (VC) was dissolved in a mixed solution in which ethylene carbonate (EC) and ethyl methyl carbonate (EMC) were mixed in a volume mixing ratio of 7:3, and LiPF$_6$ was also dissolved at a concentration of 1 M to prepare an electrolyte. The electrolyte was injected into the electrode assembly to manufacture a coin-type lithium half-cell.

Example 2: Manufacture of Battery (1) Manufacture of Positive Electrode and Battery A positive electrode and a battery were manufactured in the same manner as in Example 1 except that LiNi$_{0.85}$Co$_{0.1}$Al$_{0.05}$O$_2$ having an average particle size (D$_{50}$) of 13 μm as a first active material particle, LiCoO$_2$ having an average particle size (D$_{50}$) of 14 μm as a first pattern active material particle, and LiCoO$_2$ having an average particle size (D$_{50}$) of 14 μm as a second pattern active material particle were used. In this case, a first active material layer had a thickness of 50 μm. Also, a first pattern had a thickness of 35 μm and a porosity of 29%, and a second pattern had a thickness of 25 μm and a porosity of 24%.

Example 3: Manufacture of Battery (1) Manufacture of Positive Electrode and Battery A positive electrode and a battery were manufactured in the same manner as in Example 1 except that LiCoO$_2$ having an average particle size (D$_{50}$) of 15 μm as a first active material particle, LiNi$_{0.6}$Co$_{0.2}$Mn$_{0.2}$O$_2$ having an average particle size (D$_{50}$) of 14 μm as a first pattern active material particle, and LiFePO$_4$ having an average particle size (D$_{50}$) of 5 μm as a second pattern active material particle were used. In this case, a first active material layer had a thickness of 70 μm. Also, a first pattern had a thickness of 24 μm and a porosity of 29%, and a second pattern had a thickness of 16 μm and a porosity of 24%.

Comparative Example 1: Manufacture of Battery (1) Manufacture of Positive Electrode and Battery A positive electrode and a battery were manufactured in the same manner as in Example 1 except that a first pattern had a thickness of 20 μm and a second pattern had a thickness of 30 μm.

Comparative Example 2: Manufacture of Battery (1) Manufacture of Positive Electrode and Battery A positive electrode and a battery were manufactured in the same manner as in Example 2 except that a first pattern had a thickness of 25 μm and a second pattern had a thickness of 35 μm.

Comparative Example 3: Manufacture of Battery (1) Manufacture of Positive Electrode and Battery A positive electrode and a battery were manufactured in the same manner as in Example 3 except that a first pattern had a thickness of 16 μm and a second pattern had a thickness of 24 μm.

Experimental Example 1: Evaluation of Volume Expansion Rate of First Pattern and Second Pattern, Thickness Change Rate of Electrode, and Cycle Characteristics The batteries according to Examples 1 to 3 and Comparative Examples 1 to 3 were charged and discharged, and then the volume expansion rate, discharge capacity, initial efficiency, capacity retention rate, and thickness change rate of an electrode were evaluated. The results thereof are shown in Table 1.

Meanwhile, charging and discharging were performed at 0.1 C in $1^{st}$ and $2^{nd}$ cycles and at 0.5 C in $3^{rd}$ to $49^{th}$ cycles. A $50^{th}$ cycle was completed when a charged state (a state in which lithium ions were intercalated into a negative electrode) was reached, and a capacity retention rate was evaluated.

Charging condition: Constant current (CC)/constant voltage (CV) (0.02 C current cut-off/4.4 V (Example 1 and Comparative Example 1), 4.25 V (Example 2 and Comparative Example 2), and 4.30 V (Example 3 and Comparative Example 3)

Discharging condition: Constant current (CC) 3 V condition

From a result obtained after a $1^{st}$ cycle of charging and discharging, discharge capacity (mAh/g) and initial efficiency (%) were derived. Specifically, initial efficiency (%) was calculated as follows.

Initial efficiency (%)=(Discharge capacity after $1^{st}$ discharging/initial charge capacity)×100

A capacity retention rate and a thickness change rate of an electrode each were calculated as follows.

Capacity retention rate (%)=($49^{th}$ discharge capacity/initial discharge capacity)×100

Thickness change rate of electrode (%)=(Difference between final electrode thickness and initial electrode thickness/Initial electrode thickness)×100

The volume expansion rate of a first pattern or a second pattern was calculated by Equation 1 below in which A represents a thickness of a first pattern or a second pattern before charging and discharging and B represents a thickness of a first pattern or a second pattern after charging and discharging.

Volume expansion rate=[(B−A)/A]×100    [Equation 1]

The thickness was identified using a micrometer.

TABLE 1

| Battery | Volume expansion rate of first pattern (%) | Volume expansion rate of second pattern (%) | Discharge capacity (mAh/g) | Initial efficiency (%) | Capacity retention rate (%) | Thickness change rate of electrode (%) |
|---|---|---|---|---|---|---|
| Example 1 | 0.2 | 0.5 | 180 | 98.1 | 97.2 | 0.6 |
| Example 2 | 0.09 | 0.2 | 175 | 86.2 | 97.8 | 0.4 |

TABLE 1-continued

| Battery | Volume expansion rate of first pattern (%) | Volume expansion rate of second pattern (%) | Discharge capacity (mAh/g) | Initial efficiency (%) | Capacity retention rate (%) | Thickness change rate of electrode (%) |
|---|---|---|---|---|---|---|
| Example 3 | 0.08 | 0.15 | 154 | 93.1 | 97.0 | 0.2 |
| Comparative Example 1 | 0.2 | 0.5 | 172 | 97.6 | 95.2 | 1.0 |
| Comparative Example 2 | 0.09 | 0.2 | 169 | 85.5 | 95.5 | 0.7 |
| Comparative Example 3 | 0.08 | 0.15 | 149 | 92.1 | 95.0 | 0.4 |

When Example 1 and Comparative Example 1, Example 2 and Comparative Example 2, and Example 3 and Comparative Example 3 were compared, respectively, it can be confirmed that Examples exhibited a relatively low thickness change rate of an electrode, relatively high discharge capacity and a relatively high capacity retention rate. This is considered to be due the fact that a second pattern having a relatively high volume expansion rate has a thickness lower than that of a first pattern so that the thickness of a positive electrode may be slightly changed even when charging and discharging were repeated, and thus a contact area between a positive electrode and an electrolyte in a first active material layer may be sufficiently ensured.

The invention claimed is:

1. A positive electrode comprising:
a current collector;
a first active material layer including first active material particles and disposed on the current collector; and
a first pattern and a second pattern alternately disposed separately from each other on the first active material layer, wherein:
the first pattern includes first pattern active material particles;
the second pattern includes second pattern active material particles;
the first pattern has a thickness greater than that of the second pattern; and
the second pattern has a volume expansion rate greater than that of the first pattern.

2. The positive electrode of claim 1, wherein:
the first active material particle and the first pattern active material particle are $LiCoO_2$; and
the second pattern active material particle is any one of $LiNi_{1-x1-y1}Co_{x1}Mn_{y1}O_2$ ($0<x1<1$ and $0<y1<1$) and $LiNi_{1-x2-y2}Co_{x2}Al_{y2}O_2$ ($0<x2<1$ and $0<y2<1$).

3. The positive electrode of claim 1, wherein:
the first active material particle is any one of $LiNi_{1-x1-y1}Co_{x1}Mn_{y1}O_2$ ($0<x1<1$ and $0<y1<1$) and $LiNi_{1-x2-y2}Co_{x2}Al_{y2}O_2$ ($0<x2<1$ and $0<y2<1$);
the first pattern active material particle and the second pattern active material particle are $LiCoO_2$; and
the second pattern has a porosity lower than that of the first pattern.

4. The positive electrode of claim 3, wherein a difference between the porosity of the first pattern and the porosity of the second pattern is 5 percentage points or more.

5. The positive electrode of claim 1, wherein:
the first active material particle is $LiCoO_2$;
the first pattern active material particle is at least one of $LiNi_{1-x1-y1}Co_{x1}Mn_{y1}O_2$ ($0<x1<1$ and $0<y1<1$) and $LiNi_{1-x2-y2}Co_{x2}Al_{y2}O_2$ ($0<x2<1$ and $0<y2<1$);
the second pattern active material particle is at least one of $LiFePO_4$ and $LiMn_2O_4$; and
the second pattern has a porosity lower than that of the first pattern.

6. The positive electrode of claim 5, wherein a difference between the porosity of the first pattern and the porosity of the second pattern is 5 percentage points or more.

7. The positive electrode of claim 1, wherein the first pattern has a thickness 1.1 to 2 times greater than that of the second pattern.

8. A secondary battery comprising:
the positive electrode according to claim 1;
a negative electrode;
a separator interposed between the positive electrode and the negative electrode; and
an electrolyte.

* * * * *